United States Patent [19]

Iseli

[11] Patent Number: 4,906,829
[45] Date of Patent: Mar. 6, 1990

[54] DEVICE FOR CODING AND IDENTIFYING A CODING ELEMENT

[75] Inventor: Fritz F. Iseli, Richertswil, Switzerland

[73] Assignee: Pfaff Industriemaschinen GmbH, Kaiserslautern, Fed. Rep. of Germany

[21] Appl. No.: 228,932

[22] PCT Filed: Nov. 5, 1987

[86] PCT No.: PCT/EP87/00677
§ 371 Date: Jul. 15, 1988
§ 102(e) Date: Jul. 15, 1988

[87] PCT Pub. No.: WO88/04083
PCT Pub. Date: Jun. 2, 1988

[51] Int. Cl.$^4$ ............................................. G06K 7/14
[52] U.S. Cl. ...................................... 235/454; 235/457
[58] Field of Search ................ 235/457, 454; 369/103, 369/109

[56] References Cited

U.S. PATENT DOCUMENTS 3,753,249  8/1973  Silverman .......................... 235/457
4,034,211  7/1977  Horst .
4,544,836  10/1985  Galvin .

FOREIGN PATENT DOCUMENTS 2470999  6/1981  France .

Primary Examiner—Harold I. Pitts
Attorney, Agent, or Firm—McGlew & Tuttle

[57] ABSTRACT

A device for the identification of a code on a code carrier is composed of a light source, a code carrier with a plurality of light-permeable code-windows which provide polarization filters. The codification is manifested in different polarization and is composed of a receiving device with a ray splitting mirror for splitting light coming from the code carrier into two beam parts and also providing for each beam part one light sensitive detector. This device also has polarization filters interposed so that they face each other in crossed polarization direction.

7 Claims, 3 Drawing Sheets

FIG. 3
|   | D1 | D2 |
|---|----|----|
| A | 1  | 1  |
| B | 1  | 0  |
| C | 0  | 1  |
| D | 0  | 0  |
EXOR
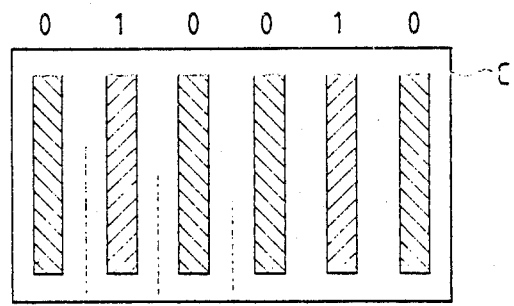
FIG. 4
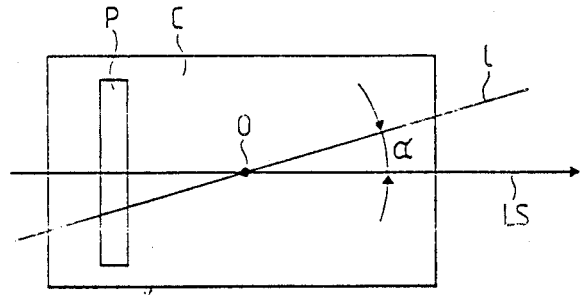
FIG. 5

4,906,829

DEVICE FOR CODING AND IDENTIFYING A CODING ELEMENT

BACKGROUND OF THE INVENTION

1. Field of the Invention

The invention is concerned with the field of code-detection and relates to a device, which is composed of a transmitter, a receiver and a code carrier, the transmission medium preferably being light and, thus, the receiver being a light sensitive element.

The scanning of code carriers, which can be recording tracks for magnetic scanning, arrangements of colors for light-scanning, charge patterns for electrical scanning etc., are substantially based on the principle of scanning in series (serial scanning). This requires that either the scanning means is in movement or that the code carrier is in movement. This requires a movement between the code arrangement in relation to the means detecting this code arrangement. In general the code carrier is directed past the reading device or detecting device, because scanning devices are very expensive.

The guiding of the carrier has to satisfy high requirements in order to obtain a reasonable detection. This has the direct effect of an increase of the mechanical expense. Inaccuracies in the guiding of the code carrier deteriorate the security of identification. That means that the entire coding becomes questionable, if this security is not guaranteed. Furthermore apart from the exact guiding and moving of the carriers other mechanisms are necessary, which register and control the process of the movement. As is known, this is realized by means of synchronization marks on a synchronization track, which are provided additionally and which ar connected closely to the coding. This supplementary expense does not render the process of reading and scanning any easier, but on the contrary, taking into account the disposal of other geometrical provided elements, the requirements of the system augment.

SUMMARY OF THE INVENTION

The invention provides coding means and a device accompanying it, which do not react delicately in their coordination to undesirable movements (trouble in the reading process by unexpected deflections from the true path), and which provide a high security of identification in spite of additional degrees of freedom. Thus a system, which in its entirety is simple and rugged in its construction and which does not involve many expenses in its production is to be provided.

A coding arrangement (medium) is used, which provides the capacity, to impress informations in the used transmission medium, the information being utilized in the detection by means of a special device.

Accordingly, it is an object of the invention to provide a device for the detection of coding elements which comprises a transmitter radiating a medium, a code carrier which provides a means for impressing information into the medium, a receiving device for evaluating medium reflected by the transmitter and which evaluates the medium coming from the code carrier.

A further object of the invention is to provide a device for detecting coding elements which is simple in design, rugged in construction and economical to manufacture.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which preferred embodiments of the invention are illustrated.

BRIEF DESCRIPTION OF THE DRAWINGS

In the Drawings

FIG. 3 is a table of true values of the positions of the operating system shown in FIG. 2;

FIG. 4 is a code carrier with the digital forms of condition;

FIG. 5 is a schematic representation of a possible deflection from the given reading axis as an instant picture, for example as part of a guiding of the code carrier;

DESCRIPTION OF THE PREFERRED EMBODIMENTS

Figure 1:
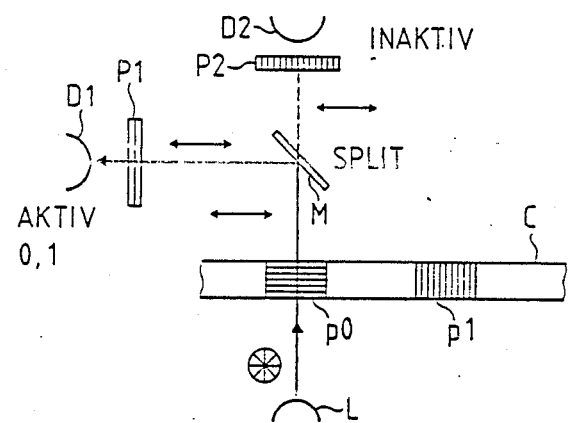
FIG. 1 is a schematic diagram of a basic arrangement of transmitter/receiver and code carrier.
Figure 2A:
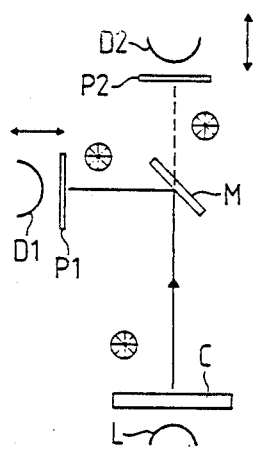
FIG. 2a, 2b, 2c, 2d show different positions of the operating system.
Figure 2B:
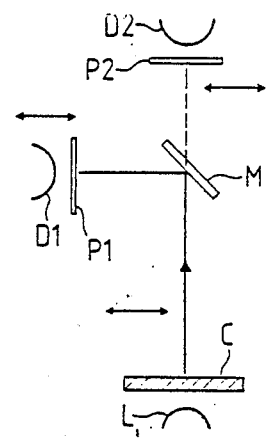
Figure 2C:
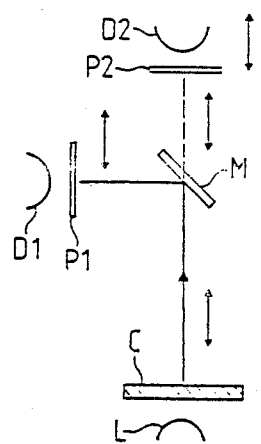
Figure 2D:
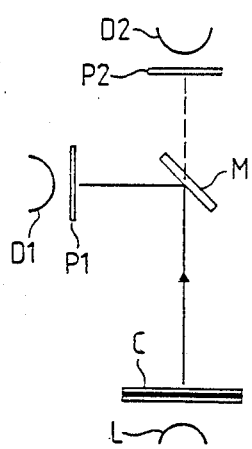

Referring to the drawings, in particular, the invention embodied therein comprises a device for detecting of coding elements which includes a code carrier which provides means P for impressing information into a medium which is reflected by a transmitter S which radiates the medium and a receiving installation E connected to the code carrier and which has means including elements P1, D1/P2 and D2 evaluating means for evaluation of the information transmitted by the medium.

The schematic principle representation of FIG. 1 shows the basic arrangement of a code-detection system, which is composed of a transmitter/receiver and a code carrier. The transmitter is composed of one light source L, which can be an electric bulb in the visible area or in the UV- or the IR- limit-area, a laser source in a usable area, or another radiation source.

In order to prevent stray light, outside light, etc., from participating in the reading process, the radiation source is used preferably in a pulsation condition and only the information, which is transmitted by the radiation is evaluated and analyzed by the pulsation frequency of the light source.

The receiver comprises two detectors D1 and D2, which receive light over a beam splitter mechanism from the light source L. The beam splitter mechanism is represented here by a semi-permeable mirror M in a relation of around 50/50. Each detector D1 and D2 provides a polarized filter P1 and P2 interposed, which are deposed optically cross-wise to each other. The code carrier comprises coding elements P, providing polarized filters P0 and P1 as permeable windows as well, and according to the coding element 0 or 1 the filters are disposed optically cross-wise to each other. In order to distinguish the light-polarized means in the detection area and on the coding carrier, two stationary filters P1 and P2 are assigned to the detectors and the non-stationary filters P are designated on the code carrier C with the bit-information P0 and P1. However, by using the stationary filters, each detector is either a 0-detector or a 1-detector, both detectors working simultaneously, and 0 (zero) is not manifested by a lack of light for example.

The light coming from the radiation source provides oscillations in all the levels of the direction of propagation, which is represented by a circle with spokes next to the light beam.

Behind the P0 filter only light with a defined oscillation is left. Thus the light has been impressed with the information ZERO. This light with the information ZERO is split in the mirror M in two beams and is guided at the same time to the 0- and 1-detectors. In the present case, the detector D1 is a D0-detector (by a turn of 90 degrees it becomes a 1-detector). The detector D1 registers a 0-coding-element, the detector D2 does not register any light, which means neither 0 nor 1 in the evaluation. Thus an indifferent condition in relation to the identification is excluded; both bit 0 and 1 receive a high-level. This property, to be able to renounce completely on a synchronization track is rendered possible by the fact that the bit-sequence is carried out with the reading process, as will be explained in further detail below.

When the code-carrier in FIG. 1 is slid to the left to the next bit P1, the detector D2 receives a bit-1-impressed light and the 0-detector D1 receives no light. Thus the detector D2 indicates the presence of a 1-bit in the beam.

The FIGS. 2A through 2D show schematically four possible positions of the operation of the entire system and FIG. 3 shows the table of true values belonging to these positions. In the case A no coding carrier is in the beam path, both detectors receive light, and together they indicate the condition 1,1 according to the table of true values. This is an equivalent and means "no coding carrier is present". The cases B and C show the adequately polarized bit-0 and bit-1 and the detectors D1 and D2 indicate the conditions 1.0 and 0.1 according to the table of true values. These are equivalents (together XOR) and mean a ZERO or a ONE of the code on the code carrier. In the case D a translucent object is situated in the path of the beam, for example the code carrier frame, and the detectors indicate "no light", which corresponds to the condition "no light" according to the table of true values. This is an equivalent again and means "covered course of beam" [defiladed, masked path of rays]. Taking into account the condition "no light on the detectors", a table of true values can be found now, by means of which the described four conditions can be distinguished. However, in order to distinguish a ONE or a ZERO in the identification, meaning a code, only HIGH (inverted LOW) are admitted, which does not forward additional security, but also the possibility to use the code as synchronization track.

The synchronization track in this case is given by the code windows, since the system (of equal width) can detect the windows 0 or 1. For this purpose it is possible as well to evaluate the XOR-function as well as for the identification. Taking into account the equivalences, and thus making full use of the table of true values makes possible a detection of the condition from "something in the path of the rays" to "nothing at all in the path of the rays". These conditions are shown in FIG. 4, referring to the code carrier.

FIG. 4 shows a 6-byte carrier C composed of windows with polarization filters P0 and P1, which are crossed to form a bit-sequence 0.1, 0.0, 1.0. According to the table of true values the detectors D1, D2 indicate "no code carrier here yet" and eventually they indicate with 0.0 registering or "frame arrived" and immediately afterwards they identify the first 0-bit (1.0), which is recognized by the detector D1. A light tight cross-piece (0.0 eventually follows, which is followed by a 1-bit (0.1), which however now is recognized by the detector D2. Together these detectors have identified 2 windows, which correspond to 2 elements in the synchronization, inserted into the information.

In this way the code carrier is scanned, until a 1.1 arrives and thus the detectors indicate the "end of the code carrier" and with this information the evaluation system can start the following step in the process. The conditions of the table of true values can be evaluated in a way, that on one channel solely the admitted conditions (antivalences) are evaluated and not-admitted conditions are filtered out (equivalences), in order to obtain a higher security of identification. On a second channel the entire table of true can be evaluated simultaneously.

FIG. 5 shows in a schematic representation the relative insensitiveness of the mechanical guiding of the code carrier past the transmitter/receiver. A tape skew 1 around a turning point 0 at an angle alpha in relation to the ideal reading axis LS is marked in. One of the marginal windows P of great concern is marked in, a window in the area of the turning point would not of great concern. This deflection or deviation of the desired direction of reading (scanning) would have a disturbing effect on the synchronization track, which is entrained. However in the inventive solution the bit-windows carry out the synchronization at the same time, it solely has to be guaranteed that all the windows of an x-byte can be read or identified in the tape skew as well. The tape skew provides geometrical and optical limitations, that is the polarization angle, which is a function of the detector intensity. In the experiments, it has been found, that a tape skew can be tolerated without a problem within $\pm 20$ degrees. Including all the expenses to be made, which certainly is not the object of the invention, a jitter of $\pm 40$ degrees can just be detected (the limit is theoretically situated at about 45 degrees, the half of the crossing angle), however, such deviations from the path are extremely unlikely to happen anyway.

This explanation shows however, that this principle of identification is safe only under normal circumstances of operation, but provides the same security under disturbed operation. Such operation conditions, however, do not have to be a "disturbed" operation. The invention rather relates to the object to provide an identification process with a considerable mechanical degree of freedom. This renders the proposed system suitable for the rough operation of transport systems. In addition to the existing transport systems, even those which somewhere have tottering or loose rods, can be subsequently equipped with this identification system according to the invention.

Figure 6:
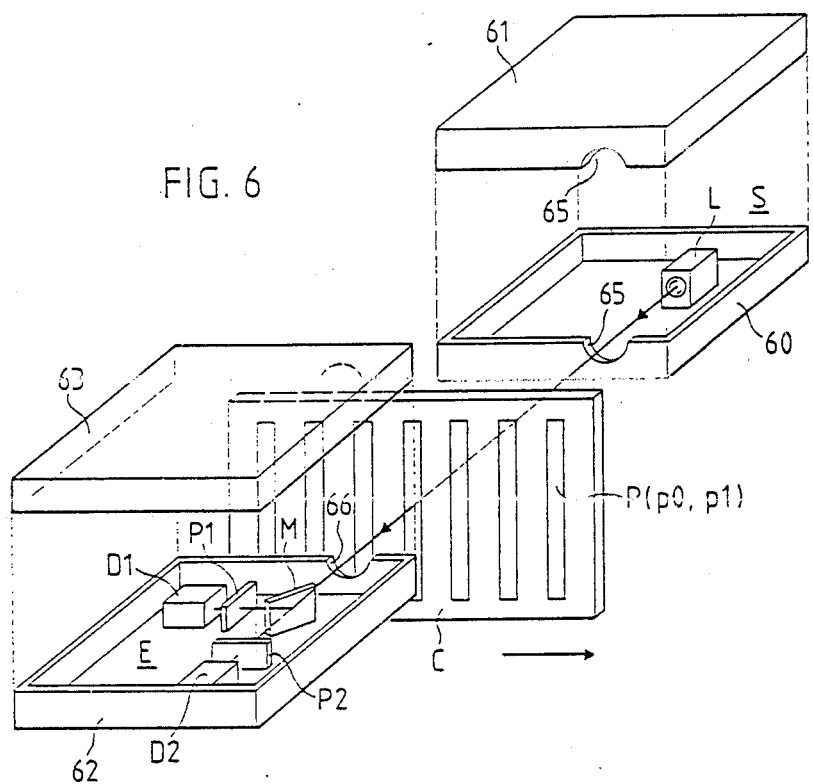
FIG. 6 is an exploded perspective of a first embodiment of a fork barrier represented in perspective.
Figure 7:
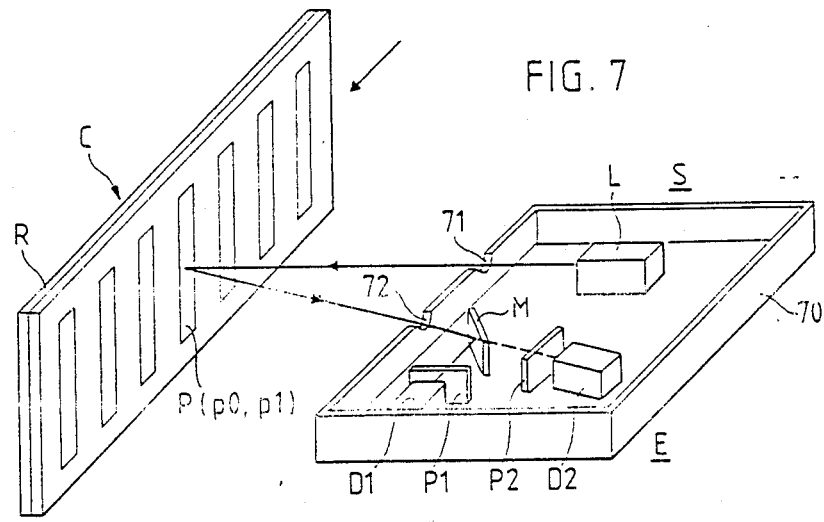
FIG. 7 is a similar view of a second embodiment represented in perspective.

FIGS. 6 and 7 show two embodiments of the invention, one embodiment (FIG. 6) working with a light barrier by means of beaming through irradiation and the other embodiment (FIG. 7) working by means of reflection with transmitter/receiver disposed on the same side.

The arrangement according to FIG. 6 corresponds in its construction to the solution discussed in relation to the model of the principle, that is the one comprising a beaming through irradiation of the code carrier C. The figure shows in a three-dimensional representation the transmitter S with the light source L disposed in the lower part of a casing 60, the lower part of the casing 60 being fashioned in such a way that it can be closed by means of an upper part of the casing 61. Through a light-outlet-opening 65, in case the distance to the code carrier and the receiver E is not too far, the light beam reaches the outside without any special optical auxiliary means and falls directly onto the receiver E, when no code carrier is in the barrier (equivalence); or the light beam is darkened [blacked out], when any object, which is not transparent is situated there (equivalence) or it [the light beam] falls through a coding window (antivalence) onto the receiver E, which detects the arriving light as described.

The receiver E is shown in FIG. 6 disposed in a lower part of the casing 62 in a manner similar to transmitter S. In the casing, behind a light-inlet-opening 66 the ray splitting mirror M and the two analyzing filters P1 and P2 are disposed, for example in slots (not represented) stuck into the casing bottom. The detectors D1 and D2, which are associated with filters P1 and P2 respectively, are disposed behind the two filters P1 and P2. The detectors D1, D2 are stuck into the enlarged cavities (not represented) of the casing bottom as well. The lower bottom of the casing of the receiver 62 is covered by the upper bottom of the casing (63).

Preferably the individual casing parts 60, 61, 62, 63 are fashioned in such a way, for example as spraying discharge pieces, that they can be used for the transmitter as well as for the receiver and as an upper as well as a lower part, and thus the rugged and simple character of the construction of the entire detection installation is emphasized.

A further embodiment is shown in FIG. 7, in which detection installation, transmitters and receiver E are disposed in the same casing. The light from the light source L comes through a coding window P (P0, P1) is reflected by the reflecting rear wall R, since it provides the right level of oscillation back through the same coding window, and goes through a light inlet opening 72 onto the ray splitting mirror M, over the analyzers or filters P1, P2 to the detectors D1, D2. The reflector R has to be fashioned in such a way that the light arriving from the polarization filter P0, P1 not strayed and/or is not broken. A straying of the light deteriorates the gain by deflection of a portion of the light, which has already been polarized and the second augments in an unnecessary way the angle of incidence/reflection of the light rays. This angle should be as small as possible, so that the construction of the installation of the detector and the transmitter/receiver can be kept small. As in the case of the light barrier, pursuant to FIG. 6, here, as well, casing parts can be fashioned in injection die-casting technique in such a way, that the upper and the lower part are exchangeable.

While specific embodiment of the invention have been shown and described in detail to illustrate the application of the principles of the invention, it will be understood that the invention may be embodied otherwise without departing from such principals.

What is claimed is:

1. A device for the identification of a coding, comprising:
    light means for supplying light as a light source;
    code carrier means (C), including said coding for receiving said light source and transmitting information to light which has passed through said coding or has been reflected off said coding, said code means including a code window (P) having a code polarization filter, said code window being arranged in the path of the light and representing a code element;
    detector means including a plurality of detectors at least one of said detectors having a superposed detector polarization filter corresponding to each possible code element value said detector means for receiving light passing through or reflected off said coding and for reading information contained in the received light;
    beam splitter means (M) for splitting the light into separate light beams once the light has passed the code window (P) of the code carrier (C), said beam splitter means (M) being arranged between the code carrier C and the detector polarization filters, said polarization filters being arranged in polarization directions vertical to one another, one of said separate light beams serving as a signal entering a detector only if the polarization direction of a corresponding detector polarization filter corresponds to the polarization direction of the code polarization filter of the code window (P).

2. A device according to claim 1, wherein the code windows (P) have a uniform size in a direction of advance.

3. A device according to claim 1, wherein the code windows (P) are separated by webs of the code carrier (C) in a direction of advance.

4. A device according to claim 1, wherein the beam splitter (M) is a mirror, semi-reflective for the light source.

5. A device according to claim 1, wherein the detector means and the light source assigned to it are arranged in structurally separate units (60, 61; 62, 63) and opposite one another and wherein the code carrier (C) is led between these units (60, 61; 62, 63).

6. A device according to claim 1, wherein the detector means and the light source assigned to it are arranged in the same housing 70, so that the light emitted from the light source is reflected by a reflector (R) of the code carrier (C) arranged on the sides of the code window (P) not facing the housing (70) and said emitted light enters the detectors (D1), (D2) once it has passed the light entrance (72), the beam splitter means (M) and the detector polarization filters.

7. A device according to claim 1, wherein the code carrier (C) has a bidirectional reflector (R) and a number of code polarization filters (p0l, p0r, p1l, p1r) arranged on both sides above it.

* * * * *